United States Patent
Tret'jakov et al.

(10) Patent No.: US 9,539,569 B2
(45) Date of Patent: Jan. 10, 2017

(54) METHOD FOR PRODUCING A SORBENT FOR SELECTIVE RECOVERY OF SCANDIUM IONS

(71) Applicant: Axion-Rare-Earth and Noble Metals JSC, Perm (RU)

(72) Inventors: Vitaliy Aleksandrovich Tret'jakov, Perm (RU); Dmitriy Alekseevich Kondruckiy, Volzhskiy (RU); Gadzhi Rabadanovich Gadzhiev, Volzhskiy (RU); Aleksandr Faddeevich Bobrov, Mocsow (RU); Aleksey Gennad'evich Nesterov, Moscow (RU)

(73) Assignee: AXION-RARE-EARTH AND NOBLE METALS JSC, Perm (RU)

( * ) Notice: Subject to any disclaimer, the term of this patent is extended or adjusted under 35 U.S.C. 154(b) by 0 days.

(21) Appl. No.: 14/787,053

(22) PCT Filed: Jan. 17, 2014

(86) PCT No.: PCT/RU2014/000026
§ 371 (c)(1),
(2) Date: Oct. 26, 2015

(87) PCT Pub. No.: WO2014/175771
PCT Pub. Date: Oct. 30, 2014

(65) Prior Publication Data
US 2016/0101416 A1  Apr. 14, 2016

(30) Foreign Application Priority Data
Apr. 26, 2013  (RU) ................ 2013119306

(51) Int. Cl.
*B01J 39/20* (2006.01)
*B01J 45/00* (2006.01)
*C08F 8/10* (2006.01)
*C08F 8/40* (2006.01)
*B01J 20/30* (2006.01)
*B01J 20/26* (2006.01)
*C08F 8/12* (2006.01)

(52) U.S. Cl.
CPC ............... *B01J 39/20* (2013.01); *B01J 20/264* (2013.01); *B01J 20/3071* (2013.01); *B01J 45/00* (2013.01); *C08F 8/10* (2013.01); *C08F 8/12* (2013.01); *C08F 8/40* (2013.01)

(58) Field of Classification Search
CPC .......... B01J 39/20; B01J 45/00; B01J 20/264; B01J 20/3071; C08F 8/10; C08F 8/40; C08F 8/12
USPC ......................................... 521/31
See application file for complete search history.

(56) References Cited

FOREIGN PATENT DOCUMENTS

| | | |
|---|---|---|
| RU | 1835403 | 8/1993 |
| RU | 2010804 | 4/1994 |
| RU | 2010876 | 4/1994 |
| SU | 280839 | 9/1970 |
| SU | 280839 A1 * | 9/1970 |

OTHER PUBLICATIONS

Marhol M. et al. "Selective ion-exchangers containing phosphorus in their functional groups" J. Radioanalytical Chem., 1974, vol. 21, pp. 177-186.*
Marhol et al., "Selective Ion-Exchangers Containing Phosphorus in Their Functional Groups", Journal of Radioanalytical Chemistry, vol. 21 (1974), pp. 177-186.
Korovin at al. "Sorption Materials for Extraction of Scandium from Acidic Environments", Problems of Chemistry and Chemical Technology, 2008, No. 2, p. 156-159.

* cited by examiner

*Primary Examiner* — Michael M Bernshteyn
(74) *Attorney, Agent, or Firm* — Boyle Fredrickson S.C.

(57) ABSTRACT

A method of production of sorbents involving acylation of a macroporous styrene-divinylbenzene copolymer in the presence of the Friedel-Crafts catalyst—aluminum chloride. The acylation reaction is carried out using acetyl chloride in a dichloroethane solvent at boiling the solution. This is followed by phosphorylation of the obtained acylated copolymer with phosphorus trichloride at room temperature; the product is hydrolyzed with water, washed and dried. The technical result consists in production of a complexing adsorbent highly selective for scandium and simplification of the production process.

4 Claims, No Drawings

METHOD FOR PRODUCING A SORBENT FOR SELECTIVE RECOVERY OF SCANDIUM IONS

BACKGROUND OF THE INVENTION

Field of the Invention

The invention relates to the field of production of ion exchange resins and complexing sorbents and can be used, in particular, to extract ions of scandium from acidic process solutions.

Description of Related Art

At the present time, liquid and solid extractants, as well as ion exchange resins, are used for extraction of scandium from solutions. Notably, both extractants and ion exchange resins have inherent advantages and drawbacks.

For the purpose of combining the advantages of solvent extraction and ion exchange, porous carriers impregnated with selective extractants have been proposed. For example, equilibrium and kinetic characteristics of sorption materials based on tributyl phosphate, di-isooctyl methylphosphonate, and phosphine oxide, which are recommended for the extraction of scandium from acidic solutions, were studied (V. Yu. Korovin et al. "Sorption materials for extraction of scandium from acidic environments", Problems of Chemistry and Chemical Technology, 2008, No. 2, p. 158).

A method is known to produce chelate sorbent, represented by polystyrene-azo-3-arseno-phenol, which is recommended for selective extraction of scandium from solutions with subsequent analytical determination (RU 2010876, 15 Apr. 1994).

A method is known to produce an ion exchanger for extraction of scandium by copolymerization of nitrile, acrylic acid, divinylbenzene and 5-vinyl-α-picoline with subsequent phosphorylation of the oxidized matrix by phosphorus trichloride (SU 1835403, 23 Aug. 1993).

A method is known to produce an ion-exchange resin for scandium extraction that provides copolymerization of vinylidene phosphoric acid with styrene, acrylic acid and divinylbenzene (U.S. Pat. No. 5,449,462, 12 Sep. 1995).

A method is known to produce a complex-forming ion exchanger for extraction of scandium, involving phosphorylation with phosphorus pentachloride of a styrene-divinylbenzene copolymer chloromethylated and aminated with diethanolamine or dimethylethanolamine (RU 2010804, 15 Apr. 1994).

In general, the known materials have a low selectivity to scandium, especially in case of presence of iron (III) in the solution, which results in increased costs for extraction of scandium and a more expensive scandium end product.

A method is known to produce a sorbent selective for scandium which includes acylation of macroreticular styrene-divinylbenzene copolymer in the presence of a Friedel-Crafts catalyst (aluminum chloride) at room temperature for 80 hours, phosphorylation of the acylated copolymer with phosphorus trichloride (M. Marhol, H. Beranova, K. Cheng <<Selective ion-exchangers containing phosphorus in their functional groups>>, Journal of Radioanalytical Chemistry, 1974, Volume 21, Issue 1, pp 177-186.).

In a known method, the acylation step is carried out using carbon disulfide as solvent, resulting in fire and explosion hazard of the process. A known method is characterized by high duration of the acylation step, resulting in generally poor production effectiveness of the process. Furthermore, the selectivity of the sorbent for scandium is insufficient.

A method is known to produce a sorbent that can be used to extract scandium from solutions and includes the step of acylating a styrene-divinylbenzene copolymer with acetyl chloride in dichloroethane solution in the presence of anhydrous aluminum chloride, washing, drying, the step of phosphorylation of the acylation product with phosphorus trichloride, the step of hydrolysis with ice water, washing, drying, oxidation of the dried product with 25% nitric acid, and final rinsing of the target product (RU 280839, 20 Nov. 1970).

The drawback of this method is low selectivity of the sorbent for scandium.

SUMMARY OF THE INVENTION

The object of the present invention is to provide an effective method of producing a complexing sorbent selective to scandium.

The object is achieved by the described method of producing a sorbent for selective extraction of scandium ions, which includes a step of acylating a styrene-divinylbenzene copolymer with acetyl chloride in dichloroethane solution in the presence of anhydrous aluminum chloride, washing, drying, the step of phosphorylation of the acylation product with phosphorus trichloride, the step of hydrolysis with ice water, a final washing of the target product, wherein the starting copolymer is a macroporous styrene-divinylbenzene copolymer, the acylation is carried out at the boiling point of acetyl chloride, phosphorylation is carried out by holding the reaction mass at room temperature with subsequent introduction of glacial acetic acid in it and an additional holding of the reaction mass under stirring.

Preferably, the acylation is carried out at a temperature of 52° C. for 6 hours.

Preferably, the pre-exposure is carried out during the phosphorylation step for 24 hours, and further heating of the reaction mass containing glacial acetic acid is carried out with stirring for 48 hours.

Advantageously, the washing after the acylation step is carried out successively with dichloroethane, isopropyl alcohol and water, and the final washing of the target product is performed with water, dioxane, acetone and hot water.

This combination of the above features provides the technical result of increasing the selectivity of the sorbent to scandium.

DETAILED DESCRIPTION OF THE PREFERRED EMBODIMENTS

Without limitation to a certain theory, we can assume the following.

The increased selectivity of the sorbent is probably due to the fact that the sorbent resulted from the scope of the claimed combination of features provides the reaction of complex formation of scandium with the sterically congested group of α-hydroxyphosphonic acid. Presumably, sorption of scandium from the solution is due to solvation of phosphoryl oxygen of α-hydroxyphosphonic acid with scandium complexes formed in highly acidic environments. Here, the hydroxyl group located in the α-position relative to the group of phosphoric acid not only acts as an additional coordination point, but also contributes to an increase in electron density on the oxygen atom of the phosphoryl group and thus leads to an increase in its basicity and, as a consequence, to higher strength of the solvation complex.

Carrying out the acylation step in the claimed method at a temperature of 52° C. (the boiling point of acetyl chloride) yields a product of double acylation of styrene, which, on further phosphorylation, forms a sorbent with a higher selectivity to scandium by reducing availability of sorption sites for elements that form solvated (hydrated) complexes larger than scandium.

All of the foregoing distinguishes the sorbent we obtained and its production method from the sorbent and the production method known from its prototype.

The main steps of the claimed method are carried out at the following parameters.

Step 1. Acylation of Macroporous Styrene-Divinylbenzene Copolymer:

Pre-swelling of styrene-divinylbenzene copolymer in a mixture of dichloroethane and acetyl chloride for 0.5 hours.

Charging of aluminum chloride.

Holding the reaction mixture at boiling for 6 hours.

Step 2. Phosphorylation of the Acylation Product of Styrene-Divinylbenzene Copolymer:

Holding the acylation product of styrene-divinylbenzene copolymer in phosphorus trichloride at room temperature for 24 hours.

Holding the reaction product of acylated styrene-divinylbenzene copolymer with phosphorous trichloride at room temperature in glacial acetic acid for 48 hours.

In principle, it is possible to carry out the acylation step for 4-6 hours at 40-52° C. However, reducing the time and temperature of the process results in decrease of the copolymer conversion coefficient.

Increasing the time to more than 6 hours increases the risk of side reactions (for example: polymer cross-linking). The temperature limit of 52° C. is due to the fact that this temperature is the boiling temperature, i.e. the maximum temperature for the given conditions of the process.

Specific examples illustrating the possibilities of the invention implementation and the use of the resulting sorbent are given below.

Example of Sorbent Production.

Step 1.

A four-necked flask of 1000 ml volume equipped with a mechanical stirrer, a cooler, a tube for nitrogen subsurface supply and connected to the atmosphere through a calcium chloride tube is charged with 360 ml of dichloroethane and 48 g of acetyl chloride with stirring and then charged with 30 g of styrene copolymer containing 4% of divinylbenzene. Supply of gaseous nitrogen is turned on and the reaction mass is held at room temperature for 0.5 hours. After the holding time, the reaction mass is charged with 80 g of anhydrous aluminum chloride, heated to 52° C. and held at this temperature for 6 hours. When the acylation reaction is complete, granules are filtered and washed successively with dichloroethane, isopropyl alcohol and water until there are no chloride ions in the wash water. Washed granules of the acylated copolymer are dried at 50° C. to constant weight.

Step 2.

A three-necked flask of 100 ml volume equipped with a mechanical stirrer and a cooler and connected to the atmosphere through a calcium chloride tube is charged with 10 g of the dried copolymer acylation product resulted from the step 1 and poured with 23 ml of phosphorus trichloride. The reaction mass is held at room temperature for 24 hours, then it is filled with 19 ml of glacial acetic acid and held under stirring for 48 hours.

Step 3.

After finishing the phosphorylation reaction, the granules are filtered off and carefully hydrolyzed in 1 liter of ice water. Then they are successively washed with water, dioxane, acetone and hot water. The finished product is subjected to drying.

Example of the Sorbent Use.

Investigation of properties of the resulting sorbent and its characteristics is presented below.

Determination of selectivity of the sorbent to scandium in the presence of $Fe^{3+}$ ions.

Tests of the sorbent prepared in the example were carried out under static conditions at sorption of scandium from the test solution of the following composition: $0.05N\ Sc^{3+}$, $0.05N\ Fe^{3+}$, $2M\ H_2SO_4$.

Tests were conducted by the following procedure: a weighed wet sample of an ion exchange material was placed in a test solution with the ratio of mass of the sorbent to the volume of the model solution equal to 1:25 (g:ml) and held during a day, then the solution was analyzed for the residual content of the studied element.

According to the results of analyses, distribution coefficients ($K_d$) were calculated by the formula:

$$K_d = \frac{C_0 - C_p}{C_p} \times \frac{V_p}{m_c};$$

where $C_o$, $C_p$ are the initial and equilibrium concentrations of the element in the solution in N, respectively;

$V_p$ is the volume of the liquid phase, $cm^3$;

$m_c$ is mass of sorbent, g

Selectivity was calculated by the formula:

$s(Sc) = K_d(Sc)/K_d(Fe)$

Data on the distribution coefficients and selectivity are presented in Table 1.

TABLE 1

| Name of the sample | $K_d$(Sc) | $K_d$(Fe) | s (Sc) |
|---|---|---|---|
| Sorbent of example | 143 | 63 | 2.28 |

The distribution coefficient ($K_d$) indicates the degree of affinity of this sorbent for corresponding elements: the larger than 1 is it, the higher is the affinity. As can be seen from Table 1, the sorbent obtained by the claimed method demonstrates a considerably greater affinity for scandium than for $Fe^{3+}$.

Therefore, the above data show the achievement of the claimed technical result, because the sorbent produced in accordance with the claimed method provides increased selectivity in extraction of scandium from solutions. The claimed method is also characterized by the absence of oxidation with nitric acid and the operating temperature of the phosphorylation step at the level of room temperature, thus resulting in simplification of the whole process.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:

1. A method of producing a sorbent for selective extraction of scandium ions, including the step of acylating a styrene-divinylbenzene copolymer with acetyl chloride in dichloroethane solution in the presence of anhydrous aluminum chloride, washing, drying, the step of phosphorylation of the acylation product with phosphorus trichloride, the step of hydrolysis with ice water, final washing of the target product wherein the starting copolymer is a macroporous styrene-divinylbenzene copolymer, wherein the acylation is carried out at the boiling point of acetyl chloride solution, phosphorylation is carried out by preliminary holding the reaction mass at room temperature followed by introduction of glacial acetic acid in it with an additional holding of the reaction mass under stirring.

2. The method according to claim 1, wherein the acylation is carried out at a temperature of 52° C. for 6 hours.

3. The method according to claim 1, wherein the preliminary holding at the phosphorylation step is carried out for 24 hours, and further heating of the reaction mass containing glacial acetic acid is carried out under stirring for 48 hours.

4. The method according to claim 1, wherein the washing after the acylation step is carried out successively with ethylene dichloride, isopropyl alcohol, and water, and the final washing of the target product is carried out with water, dioxane, acetone and hot water.

\* \* \* \* \*